May 12, 1959 W. G. MOEHLENPAH 2,886,722
SHADING COIL
Filed July 23, 1956

Walter G. Moehlenpah,
Inventor.
Koenig and Pope,
Attorneys.

United States Patent Office 2,886,722
Patented May 12, 1959

2,886,722

SHADING COIL

Walter G. Moehlenpah, Ladue, Mo., assignor to Ar-Ka Engineering, Inc., St. Louis, Mo., a corporation of Delaware Application July 23, 1956, Serial No. 599,488

3 Claims. (Cl. 310—172)

This invention relates to shading coils, more particularly to a one-piece sheet metal shading coil for the stator of an alternating current motor.

Among the several objects of the invention may be noted that provision of a shading coil of the class described which may be rapidly and easily assembled with a stator and locked firmly in place by a simple clinching operation, without any necessity for welding it in place; the provision of a coil of this class which may be economically made by simple stamping operations such that all coils have substantially uniform assembly and electrical qualities; the provision of a coil of this class which is of such construction as to conserve material, and which does not require any adjuncts to lock it in place on a stator; the provision of a coil of this class which is of such construction as to be adapted for automatic assembly with and locking to a stator; and the provision of a coil of this class which, when locked on a stator, has a neat appearance. Other objects and features will be in part apparent and in part pointed out hereinafter.

The invention accordingly comprises the constructions hereinafter described, the scope of the invention being indicated in the following claims.

In the accompanying drawings, in which one of various possible embodiments of the invention is illustrated, Fig. 1 is a view in side elevation of a stator of an alternating current motor having four pole pieces each of which has a shading coil of this invention thereon, three of the shading coils being shown as locked in place and one being shown in its original condition prior to the clinching operation which locks it in place;

Corresponding reference characters indicate corresponding parts throughout the several views of the drawings.

Figure 1:
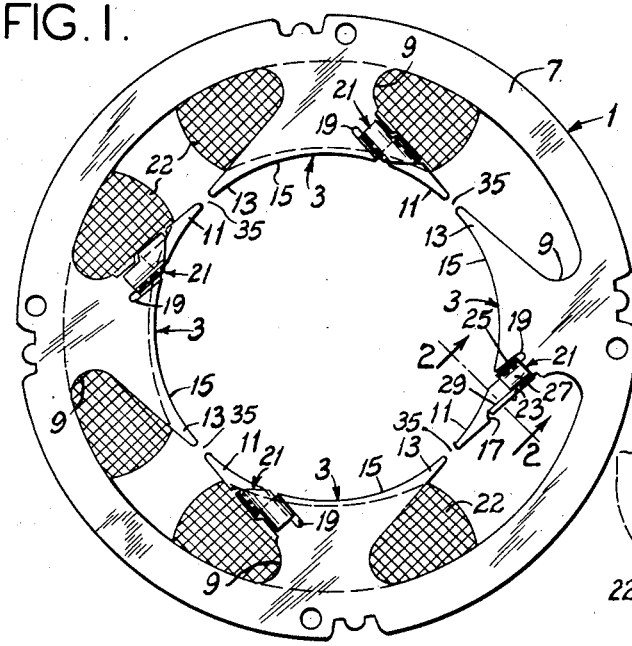

Referring to the drawings, there is indicated at 1 a stator of a typical alternating current motor having a plurality of salient pole pieces 3. As will be understood in the art, the stator is formed of a plurality of laminations such as are indicated at 5 in Figs. 2 and 3, and comprises an outer ring portion 7 from which the pole pieces 3 project radially inwardly. Each pole piece 3 has a neck portion 9 which extends inward from the ring portion 7 of the stator, and tapered projections 11 and 13 at the inner end of the neck portion. Each pole piece is formed with an arcuate pole face 15. Each projection 11 is formed with a transverse groove 17 in its outer side and with a slot 19 extending inward from the pole face 15 parallel to the bottom of the groove. A shading coil 21 of this invention is provided on the projection 11 of each pole piece, and a field coil 22 is provided around the neck 9 of each pole piece.

Figure 2:
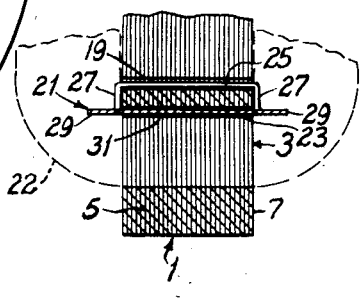
Fig. 2 is a cross section taken on line 2—2 of Fig. 1 showing the one shading coil of this invention in its original condition.
Figure 4:
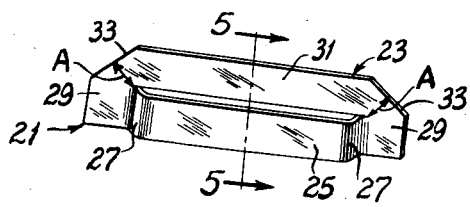
Fig. 4 is a perspective of a shading coil per se in its original condition; and, Fig. 5 is a cross section taken on line 5—5 of Fig. 4.
Figure 3:
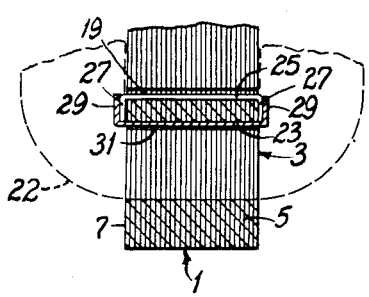
Fig. 3 is a view corresponding to Fig. 2 showing the shading coil as it appears after the clinching operation for locking it in place.
Figure 5:
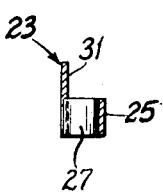

The shading coil 21 comprises a one-piece member made of an electrically conductive sheet metal such as copper. Figs. 2, 4 and 5 illustrate the shading coil in its original condition prior to application to the stator. As shown therein, the shading coil has a first elongate substantially flat part 23 and a second elongate substantially flat part 25 which consists of a portion of the sheet metal offset by stamping from the plane of the first part 23. The part 25 extends generally parallel to the part 23 and is joined at its ends to the part 23 by substantially flat integral connecting portions 27 which lie in planes transverse to the length of the elongate parts 23 and 25. Part 23 is longer than part 25 and thereby includes ears 29 which extend outward beyond the integral connecting portions 27. The width of ears 29 approximates the height of portions 27.

The shading coil is formed from a generally rectangular blank of the electrically conductive sheet metal which has a length which exceeds the width of a pole piece 3 (i.e., the axial dimension of the pole piece) by a distance approximating twice the distance from the bottom of a groove 17 to the respective slot 19. The length of the offset part 25 is slightly greater than the width of a pole piece. Part 25 is struck from the blank along one side of the blank, its outside edge being constituted by a portion of one long side of the blank. Part 25 and the portion of part 23 indicated at 31 which lies between the planes of the integral connecting portions 27 and part 25 constitute opposite long sides of the shading coil. The integral connecting portions 27 constitute the ends of the coil. The offset part or coil side 25 preferably has a width approximating half the width of the blank so that coil sides 25 and 31 are of approximately equal overall width for approximately equal electrical conductivity. The corners of the blank at the ends of the coil side 31 are cut off at an angle of approximately 45° as indicated at 33 so that the cross section of the shading coil on the diagonal lines such as indicated at A in Fig. 4 approximates the cross section of coil sides 31 and 25 and the coil ends 27 for approximately equal electrical conductivity and for another reason that will appear.

A shading coil 21 is assembled with a projection 11 of a pole piece 3 by sliding the coil on the projection 11 with part 25 foremost, entering part 25 in the slot 19 and locating part 31 in the groove 17. Gaps 35 between the ends of adjacent shoulder portions 11 and 13 permit this. Then the ears 29 are bent over on the outside of the integral connecting portions or coil ends 27, as by a clinching operation, to make the coil tightly grip the pole piece and lock it firmly in place (see Fig. 3). With the corners of the shading coil cut off as indicated at 33, there are no portions of the coil to project inward beyond the pole face 15.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

I claim:

1. A stator for an electric motor, said stator comprising an outer ring portion and pole pieces projecting inward from said ring portion, each pole piece having a neck portion an da shading-coil-receiving projection at the inner end of the neck portion, said projection having an outer transverse groove and a slot extending inward from the pole face of the pole piece parallel to the bottom of the groove, a shading coil on said projection, said coil comprising a one-piece electrically conductive sheet metal member having a first elongate substantially flat part received in the groove, a second elongate substantially flat part consisting of a portion of the sheet metal offset from the plane of the first part received in the slot, said second elongate flat part extending generally parallel to said first flat part and integrally joined at both its ends to said first flat part by substantially flat integral connecting portions which lie in planes transverse to the length of said elongate parts, said first flat part being longer than the second flat part and thereby including integral ears which extend outward beyond said integral connecting portions, said ears being bent over on the outside of said integral connecting portions.

2. A stator for an electric motor, said stator comprising an outer ring portion and pole pieces projecting inward from said ring portion, each pole piece having a neck portion and a shading-coil-receiving projection at the inner end of the neck portion, said projection having an outer transverse groove and a slot extending inward from the pole face of the pole piece parallel to the bottom of the groove, a shading coil on said projection, said coil comprising a one-piece electrically conductive sheet metal member having a first elongate substantially flat part received in the groove, a second elongate substantially flat part consisting of a portion of the sheet metal offset from the plane of the first part received in the slot, said second elongate flat part extending generally parallel to said first flat part and integrally joined at both its ends to said first flat part by substantially flat integral connecting portions which lie in planes transverse to the length of said elongate parts, said second flat part and the portion of said first flat part which lies between the planes of said integral connecting portions constituting two opposite sides of the coil, the integral connecting portions constituting the ends of the coil, said coil sides being of approximately equal overall width, said first flat part being longer than the second flat part and thereby including integral ears which extend outward beyond said integral connecting portions, said ears being bent over on the outside of said integral connecting portions.

3. A stator for an electric motor, said stator comprising an outer ring portion and pole pieces projecting inward from said ring portion, each pole piece having a neck portion and a shading-coil-receiving projection at the inner end of the neck portion, said projection having an outer transverse groove and a slot extending inward from the pole face of the pole piece parallel to the bottom of the groove, a shading coil on said projection, said coil comprising a one-piece electrically conductive sheet metal member having a first elongate substantially flat part received in the groove, a second elongate substantially flat part consisting of a portion of the sheet metal offset from the plane of the first part along one of the long sides of the first part received in the slot, said second elongate flat part extending generally parallel to said first flat part and integrally joined at both its ends to said first flat part by substantially flat integral connecting portions which lie in planes transverse to the length of said elongate parts, said second flat part and the portion of said first flat part which lies between the planes of said integral connecting portions constituting two opposite long sides of the coil, the integral connecting portions constituting the ends of the coil, said second flat part having a width approximating half the width of the member, said first flat part being longer than the second flat part and thereby including integral ears which extend outward beyond said integral connecting portions, said ears having a width approximating the height of said integral connecting portions, said ears being bent over on the outside of said integral connecting portions, the corners of said member at the ends of its other long side being cut off.

References Cited in the file of this patent

UNITED STATES PATENTS

| | | |
|---|---|---|
| 2,125,309 | Oswald | Aug. 2, 1938 |
| 2,251,673 | Gillen | Aug. 5, 1941 |